United States Patent [19]

Vasoll

[11] Patent Number: 4,485,542
[45] Date of Patent: Dec. 4, 1984

[54] SEAL PLACEMENT AND REMOVAL PRESS FOR ROTATING MACHINERY

[75] Inventor: Walter J. Vasoll, Tulsa, Okla.

[73] Assignee: Dresser Industries, Inc., Dallas, Tex.

[21] Appl. No.: 449,352

[22] Filed: Dec. 13, 1982

[51] Int. Cl.³ .............................................. B23P 19/04
[52] U.S. Cl. ...................................................... 29/252
[58] Field of Search ................ 29/252, 263, 264, 234, 29/237, 279; 254/29 A; 91/446

[56] References Cited

U.S. PATENT DOCUMENTS

| | | | |
|---|---|---|---|
| 1,861,304 | 5/1932 | Etheridge | 29/252 |
| 2,807,081 | 9/1957 | Black . | |
| 2,883,741 | 4/1959 | Yerkes | 29/252 |
| 3,024,524 | 3/1962 | Stein . | |
| 3,339,263 | 9/1967 | Dodge . | |
| 3,357,283 | 12/1967 | Geyer et al. . | |
| 3,491,431 | 1/1970 | Pewitt | 254/29 A |
| 3,564,696 | 2/1971 | Shepanski . | |
| 3,808,666 | 5/1974 | Bales, Sr. . | |
| 4,401,009 | 8/1983 | Zeuner et al. | 91/446 |

*Primary Examiner*—Robert C. Watson
*Attorney, Agent, or Firm*—Daniel Rubin

[57] ABSTRACT

A pneumatically operated piston-cylinder is adapted via concentrically located bolts to be secured coaxially of a rotary shaft of machinery about which a force fit annular seal is to be installed or removed. An annular adapter positioned beyond the cylinder from a connection with the piston includes cap screws for fastener mounting of a seal thereon. By directional application of pneumatic pressure, the piston and adapter can be controllably extended toward or withdrawn from the seal cavity of the machinery to install or remove a seal thereat.

5 Claims, 4 Drawing Figures

SEAL PLACEMENT AND REMOVAL PRESS FOR ROTATING MACHINERY

TECHNICAL FIELD

The technical field to which the invention pertains comprises the field of metal working and more specifically to fluid operated puller and pusher apparatus.

BACKGROUND OF THE INVENTION

Rotating machinery such as a centrifugal compressor typically utilizes an oil seal contained in an annular cavity about a rotating shaft. To be rendered leakproof, such seals are frequently contained in a force fit within the provided cavity, and yet because of in-service wear are regarded as maintenance items subject to replacement. Typically, the procedure for seal installation had included manual use of slide hammers while for removal, prying, pulling, etc. have frequently been resorted to. Whereas the prior manual techniques are able to effect the desired end result for installing or removing such seals, they are regarded as extremely time consuming, while frequently resulting in damage to the seal and/or its surrounding support structure. Despite recognition of the foregoing, a ready solution thereto has not heretofore been known.

SUMMARY OF THE INVENTION

This invention relates to fluid operated pusher-puller press apparatus and more specifically to such apparatus adapted for installing and removing a shaft seal within the seal cavity of rotating machinery as exemplified by a centrifugal compressor. The apparatus is comprised of a pneumatically operable piston-cylinder adapted via concentrically located bolts to be secured to the bearing face of the compressor coaxially of the compressor shaft. An annular adapter located beyond the cylinder from a connection with the piston includes cap screw connections for fastener mounting of the seal. By pneumatic pressure directionally exerted against the piston, the piston and adapter can be controllably extended coaxially toward or away from the seal cavity to place or remove a seal in a force fit relation thereat, respectively.

Being mounted on the compressor and fluid operated, installation and removal of a force fit seal is effected with substantial uniformity of concentrically applied force as to eliminate the adverse effects associated with the manual practices of the prior are. Moreover, labor time for completing the automated installation and/or removal is significantly reduced on the order of about seventy percent as compared to such prior manual practices.

It is therefore an object of the invention to provide a novel seal placement and removal press affording automated operation.

It is a further object of the invention to effect the last recited object with press apparatus specifically adapted for changing seals in a centrifugal compressor.

Figure 1:
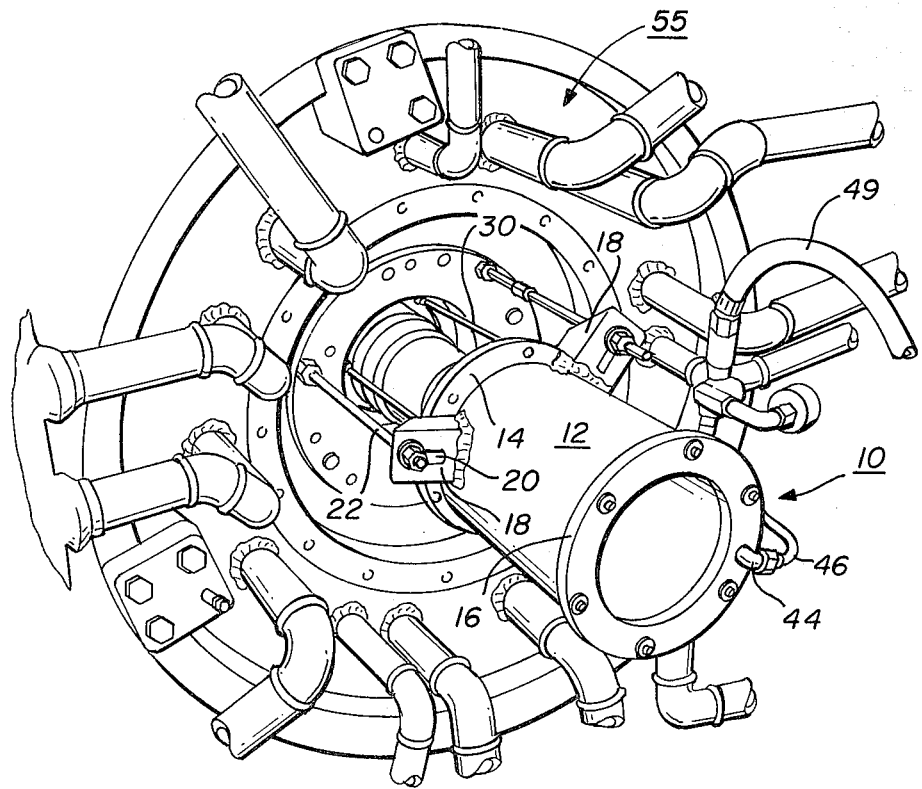
FIG. 1 is an isometric end view of the press of the invention in its mounted relation on the head of a centrifugal compressor.
Figure 2:
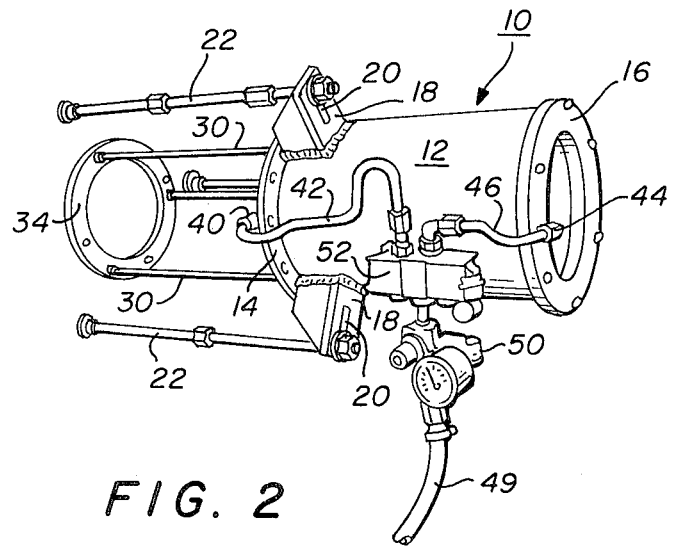
FIG. 2 is an isometric side view of the press of the invention.

Referring now to the drawings, the pusher-puller press of the invention is designated 10 and is comprised of an outer tubular housing 12 containing a flange 14 welded at the inboard end and a flange 16 welded at the outboard end. Secured to housing 12 behind flange 14 are three uniformly spaced radial lugs 18, each containing an elongated radial slot 20 for receiving and securing an axially extending mounting bolt 22. Internally of housing 12, there is provided a cylindrical sleeve 24 secured to the end flanges 14 and 16 in concentric relation with respect to the internal surface of housing 12 as to form an annular pneumatically tight cylinder 26 therebetween.

Contained in a pressure-tight relation within cylinder 26 is a piston 28 adapted for axial displacement between flanges 14 and 16. Arcuately spaced uniformly and connected to the leftward end of piston 28 ar guide rods 30, each extending in a pneumatically sealed relation via O-ring 31 through an aperture 32 provided in flange 14. Supported at the distal end of guide rods 30 is a radially extending annular adapter 34 containing equally spaced cap screws 36 for mounting a seal 38 thereon as will be described For receiving pneumatic pressure to operationally displace piston 28, there is provided through the flanges 14 and 16 in communication with the ends of cylinder 26, a tubular plug 40 to threadedly secure hose conduit 42, and at the opposite end a similar plug 44 to threadedly secure hose conduit 46. Pneumatic pressure for supplying conduits 42 and 46 is received from a source 48 via conduit 49 through pressure regulator 50 to 4-way valve 52 of a commercially available type as, for example, marketed by AAA Products International and commercially designated as their model HD2.

Figure 3:
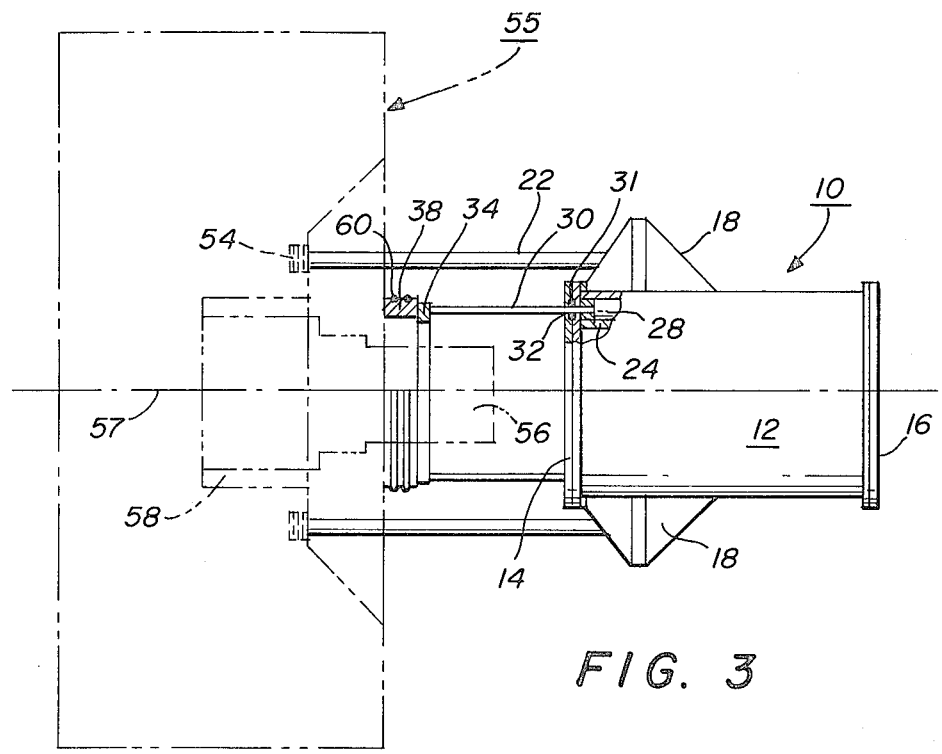
FIG. 3 is a plan view corresponding to FIG. 1.
Figure 4:
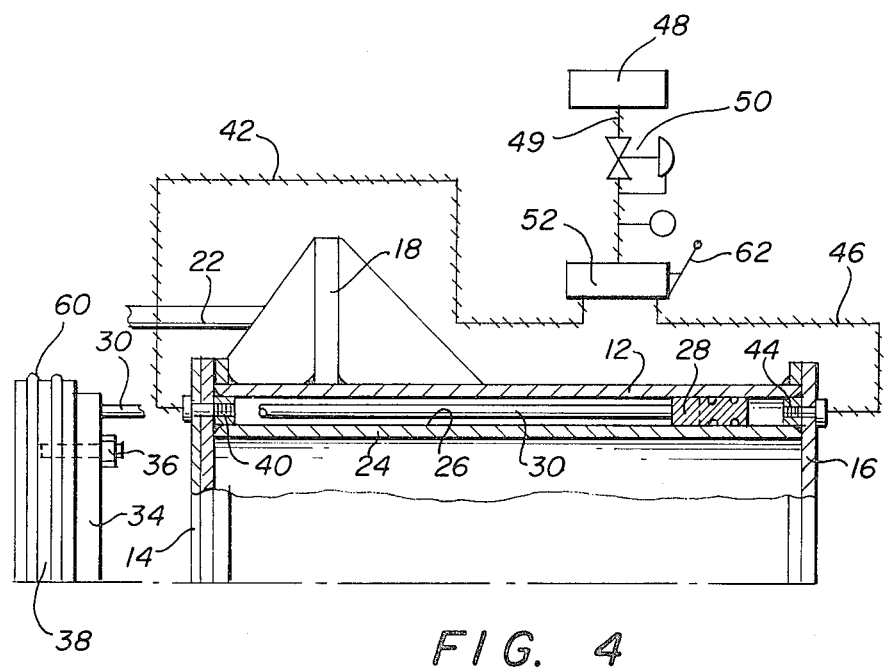
FIG. 4 is a fragmentary partially sectioned plan view of the press and control circuits hereof.

For utilizing the press 10 hereof, bolts 22 are first secured in taps 54 in the bearing housing bolt circle on the head of compressor 55. When so mounted, as can best be seen in FIG. 3, press housing 12 is coaxially positioned with respect to the axis 57 of compressor shaft end 56 and concentric bearing cavity 58. Assuming that a seal 38 is to be installed within cavity 58, the seal is first secured to the front face of adapter 34 by means of cap screws 36. Via pressure regulator 50 and the operating handle 62 of 4-way valve 52, compressed air from source 48 is then supplied via conduit 46 to cylinder 26 forcing piston 28 leftward as viewed in FIG. 4. As a result of piston displacement, guide rods 30 connected thereto simultaneously displace adapter 34 therewith toward cavity 58. As seal 38 initiates entry into cavity 58, seal O-rings 60 contact the bore wall thereat at which time the magnitude of air pressure being applied into cylinder 26 is increased until forcing seal 34 into its seated relation within the cavity. Once seal 34 is seated, adapter 34 is disconnected from the seal via the cap screws 36, after which air pressure is removed from conduit 46 and applied to conduit 42, forcing piston 28 rearward toward flange 16. To remove a seal from its installed relation within cavity 58, the described procedures are reversed, in that the adapter 34 is connected to an installed seal 34 within the cavity, after which compressed air applied through conduit 42 operates to effect removal thereof. Once pulled free, the first section of seal 38, usually comprised of two to four sections, is removed from adapter 34 and the process repeated until all sections are removed. The magnitude of pressure applied is, of course, correlated to the level of force required, and overpressure is generally avoided to preclude the possibility of adverse shock effects that could prove detrimental to the equipment.

By the above description there is disclosed a novel pusher-puller press apparatus for installing and removing shaft seals from a centrifugal compressor. The apparatus not only automates the placement and removal functions previously performed manually, but does so in a substantially reduced work time and without the adverse side effects normally associated with the manual processes previously utilized.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A pusher-puller press for installing and removing a shaft seal from a centrifugal compressor, comprising in combination:
   (a) a tubular housing having an axially extending internal cavity adapted to receive an outwardly extending end portion of a compressor shaft about which a seal is to be installed or removed;
   (b) support means adapted to mount said housing in a secured relation to a centrifugal compressor positioned coaxially with respect to the compressor shaft and a concentric seal cavity thereat;
   (c) a piston-cylinder-arrangement contained within said housing surrounding said housing cavity with the piston of said piston-cylinder being operably displaceable, when said housing is mounted by said support means, in an axial direction toward and away from the seal cavity of the compressor;
   (d) an annular adapter having a central opening generally concentric with said housing cavity, said adapter being connected to said piston facing the compressor for displacement with the piston and having fastener means by which to secure a seal mounted concentric with said displacement axis in a plane transverse thereto; and
   (e) pneumatic control means operable between a first relation effective to pressurize said cylinder and displace the piston and adapter toward the compressor cavity to an installed position of a seal and a second relation effective to pressurize said cylinder and displace the piston and adapter away from an installed position of a seal in the compressor cavity.

2. A pusher-puller press according to claim 1 in which said cylinder of said piston-cylinder is of annular cross section and said adapter is connected to the piston within said cylinder via a plurality of guide rods extending in axial direction therebetween.

3. A pusher-puller press according to claim 2 in which said support means comprises a plurality of lugs secured arcuately displaced about the periphery of said housing and an elongated bolt extending axially from each of said lugs adapted to connect with tap holes in the compressor head bearing housing bolt circle of the compressor with which the press is to be utilized.

4. A pusher-puller press according to claim 3 in which both said piston and said cylinder of said piston-cylinder are of tubular section.

5. A pusher-puller press according to claim 4 in which said pneumatic control means includes a pressure regulator and a multi-way manually operable valve to enable selectively varying the direction and magnitude of pneumatic pressure applied to the piston in said cylinder.

* * * * *